(12) United States Patent
Schutte et al.

(10) Patent No.: US 6,419,892 B1
(45) Date of Patent: Jul. 16, 2002

(54) PROCESS FOR CARRYING OUT GAS-LIQUID REACTIONS AND CONTINUOUS FLOW REACTOR FOR THIS PURPOSE

(75) Inventors: Rudiger Schutte; Hubertus Eickhoff, both of Alzenau (DE)

(73) Assignee: Degussa-Huls AG, Frankfurt (DE)

( * ) Notice: Subject to any disclaimer, the term of this patent is extended or adjusted under 35 U.S.C. 154(b) by 0 days.

(21) Appl. No.: 09/394,513

(22) Filed: Sep. 13, 1999

(30) Foreign Application Priority Data

Sep. 12, 1998 (DE) .......................... 198 41 843
Sep. 23, 1998 (DE) .......................... 198 43 574

(51) Int. Cl.$^7$ .......................................... C01B 15/023
(52) U.S. Cl. ........................................ 423/588; 423/659
(58) Field of Search ................. 423/659, 588; 422/188, 196, 197, 198, 200, 211

(56) References Cited

U.S. PATENT DOCUMENTS

| | | | |
|---|---|---|---|
| 4,337,231 A | | 6/1982 | Yaguchi et al. |
| 4,428,923 A | | 1/1984 | Kunkel et al. |
| 4,985,230 A | * | 1/1991 | Baden et al. ............. 423/659 |
| 5,071,634 A | | 12/1991 | Mannula et al. |
| 5,073,352 A | * | 12/1991 | Vu et al. ............. 422/196 |
| 5,413,872 A | | 5/1995 | Faigle |
| 5,725,837 A | * | 3/1998 | Turunen ............. 423/588 |
| 5,939,589 A | | 8/1999 | Kaibel et al. |

FOREIGN PATENT DOCUMENTS

| | | |
|---|---|---|
| DE | 1 055 501 | 4/1959 |
| DE | 1 067 783 | 10/1959 |
| DE | 1 542 089 | 3/1970 |
| DE | 195 36 971 | 4/1997 |
| DE | 198 08 385 | 9/1999 |
| EP | 0 102 934 | 5/1986 |
| EP | 0 529 422 | 3/1993 |
| EP | 0 672 617 | 9/1995 |
| EP | 0 798 039 | 10/1997 |
| GB | 620129 | 3/1949 |

OTHER PUBLICATIONS

"Hydrogen Peroxide," Ullmann's Encyclopedia of Industrial Chemistry, vol. A 13 (1989), Errata vol. A 1 to A 11, pp. 447–457. (no month).

"Industrial Reactors," Ullmann's Encyclopedia of Industrial Chemistry, 5th ed., pp. 276–278. (no date).

* cited by examiner

Primary Examiner—Wayne A. Langel
(74) Attorney, Agent, or Firm—Pillsbury Winthrop LLP

(57) ABSTRACT

The invention relates to a process for carrying out gas-liquid reactions in a continuous flow reactor having several reactor chambers arranged parallel to one another, open in the direction of flow. The space-time yield can be increased in that a reactor is used with at least three chambers, the ratio of chamber width b to slit width s of which is, on average, greater than 3 and the slit width s of which is in the range of 5 to 100 mm. Preferably, s is in the range of 5 to 50 mm and s/b in the range of 5 to 100. The continuous flow reactor according to the invention with the at least three reactor chambers and the above ratio s/b is preferably tubular and contains one or more plate stacks.

16 Claims, 4 Drawing Sheets

PROCESS FOR CARRYING OUT GAS-LIQUID REACTIONS AND CONTINUOUS FLOW REACTOR FOR THIS PURPOSE

CROSS-REFERENCE TO RELATED APPLICATIONS

This application is based on German Application Nos. DE 198 41 843.4, filed Sep. 12, 1998 and DE 198 43 574.6, filed Sep. 23, 1998, which disclosures are incorporated herein by reference.

FIELD OF THE INVENTION

The invention relates to a process for carrying out gas-liquid reactions wherein a liquid phase, which represents a reaction component or contains a reaction component in dissolved, emulsified or suspended form, and a gas phase containing a gas to be reacted, are passed through a continuous flow reactor having several reaction chambers in the presence or in the absence of a catalyst. The process relates especially to catalytic hydrogenations and oxidation reactions, such as the production of hydrogen peroxide by the anthraquinone process. The invention further provides a continuous flow reactor having several reaction chambers arranged in parallel for carrying out the process.

BACKGROUND OF THE INVENTION

Gas-liquid reactions can be carried out in bubble columns of different designs, with or without circulation of the contents of the reactor (cf. Ullmann's encyclopedia of industrial chemistry, 5th ed., Vol. B4, 276–278 (1992)). The space-time yield (STY) of gas-liquid reactions of the generic type depends to a considerable extent on the flow conditions in the reactor. An increase in the STY can be brought about by intensifying the mass transport processes by means of turbulences in the main flow. In loop reactors this can, to a certain extent, be brought about by increasing the circulation rate. Better bubble distribution can be achieved by reactor inserts, such as, for example, column trays and packings, including static mixer elements. According to another embodiment, the bubble column can also be divided into individual shafts, arranged in parallel. Neither a ratio between chamber width and slit width nor of the slit width forming the basis of the present invention is suggested by this document.

A contact and rectifying column which is also suitable for carrying out catalytic reactions is known from DE-AS 10 67 783. The column comprises several column sections with parallel plates, which form chambers that are open in the direction of the main flow. The plate spacing is 1.2 mm for the 10 m high column given as an example. The document does not teach the selection of a much larger plate spacing.

DE-AS 10 55 501 teaches a column for distillation or other mass transfer purposes. The column contains plate stacks. However, this document does not teach the use of the column for gas-liquid reactions or plate spacing.

GB 620 129 teaches a distillation device which contains plates aligned parallel to the vapour flow instead of packed in a column. Liquid and vapour flow in counter-current.

A flow reactor described in DE 195 36 971 contains substantially parallel capillary flow channels in the direction of the main flow. The width of the channels is 0.08 to 0.4 mm.

A technically significant application of a gas-liquid reaction is the anthraquinone process for the production of hydrogen peroxide (cf. Ullmann's encyclopedia of industrial chemistry, 5th. ed. Vol. A 13, 447–457 (1989)). In the hydrogenation step of this process, an anthraquinone reaction support dissolved in a working solution is converted to the anthrahydroquinone form with hydrogen in the presence of a suspension catalyst. According to DE patent specification 15 42 089 (corresponding to U.S. Pat. No. 3,423,176) the hydrogenation takes place in a three-phase reaction system in a meandering reaction chamber of consecutive, vertical, alternately narrow and wide pipes. The increase in the rate of hydrogenation was attributed to the increased turbulence achieved in this reactor. However, as taught by U.S. Pat. No. 4,428,923, it was possible to increase the microturbulence, and thus the productivity, corresponding to the space-time yield, in the same process using a meandering tubular reactor consisting of tubes of the same cross section in the rising and falling segments.

The efficiency of the energy transfer (energy dissipation) necessary to produce turbulence is influenced by the turbulence structure. The energy is broken down in cascade fashion via coarse, fine and microturbulences, and the actual chemical processes in a multi-phase system are mainly controlled by microturbulences.

Instead of in a tubular reactor using a suspension catalyst, the hydrogenation step of the anthraquinone process for the production of hydrogen peroxide according to EP-B 0 102 934 can also be carried out using a honeycomb-like catalyst. This catalyst contains many parallel channels, the walls of which are coated with the catalyst. The narrow channels necessarily lead to a considerable pressure drop and, as noted in U.S. Pat. No. 5,071,634, to a weak intermixing of the hydrogen with the working solution, may lead to a phase separation. A disadvantage of catalyst-coated, honeycomb-like elements and catalyst-coated static mixer elements is that they are difficult and expensive to regenerate, for example by exchanging the elements. Another disadvantage is the inadequate transport of heat outwards from the inner areas of the honeycomb-like catalyst support, conventionally made of a ceramic material. The zones for the catalytic reaction and the elimination of heat are thus separated from one another. This makes additional apparatus necessary for eliminating heat.

In the anthraquinone process for $H_2O_2$ production according to U.S. Pat. No. 5,071,634, a working solution through which $H_2$ is bubbled is passed through long, narrow static mixer zones with several baffle plates coated with a catalyst. The static mixer zones guarantee good intermixing of the $H_2$ gas bubbles with the working solution and also, owing to the distribution of the flow over the entire cross section, good transport of heat to the cooled external wall, but this version requires greater use of energy owing to the higher pressure drop. In addition, static mixer elements cannot be used if the process is to be operated using a suspension catalyst, because the baffle plates of the static mixer aligned longitudinally and transverse to the direction of flow lead to a catalyst sink (deposit).

In the process of EP-A 0 672 617, a mixture of the working solution and hydrogen is passed at relatively high speed from top to bottom through a fixed bed of catalyst. According to FIG. 2 of this document, the reactor can have vertical plates which consist of two nets with catalyst particles in between. Catalyst and nets fill approximately 30% of the cross section of the reactor, so that a large part of the cross section remains free for the gas-liquid dispersion to flow through. The plates must be permeable so that a constant exchange of the working solution on the left and right of such a plate is possible as a pre-condition of the catalyst reaction. A disadvantage is that, generally, hydrogen is used in excess and therefore must be recycled. Owing to the limited level of catalyst, the reactor volume is higher and thus the use of expensive working solution increases.

SUMMARY OF THE INVENTION

The object of the present invention is to provide a process for carrying out gas-liquid reactions which, through the improved design of the reactor, leads to a higher space-time yield (STY) than using known tubular continuous flow reactors. The reactor should have as simple a construction as possible and should be suitable for carrying out gas-liquid reactions in the presence of solids suspended in the liquid medium, such as suspension catalysts. It is another object of the invention to provide an anthraquinone process for producing hydrogen peroxide using a suspension catalyst wherein the STY is increased compared with the process using known, meandering, tubular reactors.

A process for carrying out gas-liquid reactions is provided, wherein a liquid phase, which is a reaction component or contains a reaction component in dissolved, emulsified or suspended form, and a gas phase, containing a gas to be reacted, are passed in co-current, in the presence or absence of a catalyst, through a continuous flow reactor having at least three slit-shaped reactor chambers arranged parallel to one another and designed for the same direction of flow, the ratio of the chamber width b to the slit width s of which is, on average, greater than 3, which is characterized in that a continuous flow reactor is used, the reactor chambers of which have a slit width s in the range of 5 to 100 mm.

Preferred embodiments of the invention relate to the use of the process for the production of hydrogen peroxide by the anthraquinone process, and to particularly preferred designs of the reactor. The ratio b/s of the particularly preferred tubular reactor to be used is usefully in the range of 5 to 100, especially 10 to 50, and the slit width s in the range of 5 to 100 mm, especially 5 to 50 mm.

The continuous flow reactor suitable for carrying out the process comprises a reactor wall in the form of a tube or vessel, an inlet for introducing the reaction components, an outlet for discharging the reacted reaction mixture and at least three slit-shaped reactor chambers arranged parallel to one another and designed for the same direction of flow, the ratio of the chamber width b to the slit width s of which is, on average, greater than 3, and characterized in that the slit width s is in the range of 5 to 100 mm.

In the continuous flow reactors according to the invention, microturbulences are produced by simple means, resulting in acceleration of the reaction. It is known that the mass-related dissipation performance (W/kg) decreases as the macro scale of the large-scale turbulence (=dimension of the largest balls of primary turbulence occurring) increases. As a result of the form of the reactor according to the invention it is possible to minimise the large-scale turbulences and to increase the dissipation performance. From the definition $d_{eq}=4A/U$, wherein $d_{eq}$ is the equivalent diameter in a reaction chamber of a different shape corresponding to the hydraulic diameter in a round tube and A corresponds to the area and U the circumference of the other reaction chamber, the equation $d_{eq}=2bs/(b+s)$, wherein s is the slit width, corresponding approximately to the macro scale, and b is the chamber width, follows for rectangular cross sections, such as the slit-shaped reactor chambers according to the invention; for s<<b, $d_{eq} \cong 2s$ applies. This equation says that, in the slit-shaped reaction chambers, with the same Reynolds number as in round tubes, only about half the macro scale is present. Thus, in the slit-shaped channels, compared with a tube bundle, the same dissipation is achieved with a much lower pressure drop. Not only the rate of flow, but also wall friction has an effect on the pressure drop. As the laminar area is approached, the pressure drop in the reactor according to the invention is further reduced. It is surprising that these aspects have never yet been applied in the design of continuous flow reactors for gas-liquid reactions.

BRIEF DESCRIPTION OF THE DRAWINGS

The invention is further explained with reference to the figures:

FIG. 2b shows a cross section through the reactor of FIG. 2a.

DETAILED DESCRIPTION OF THE INVENTION

Figure 1:
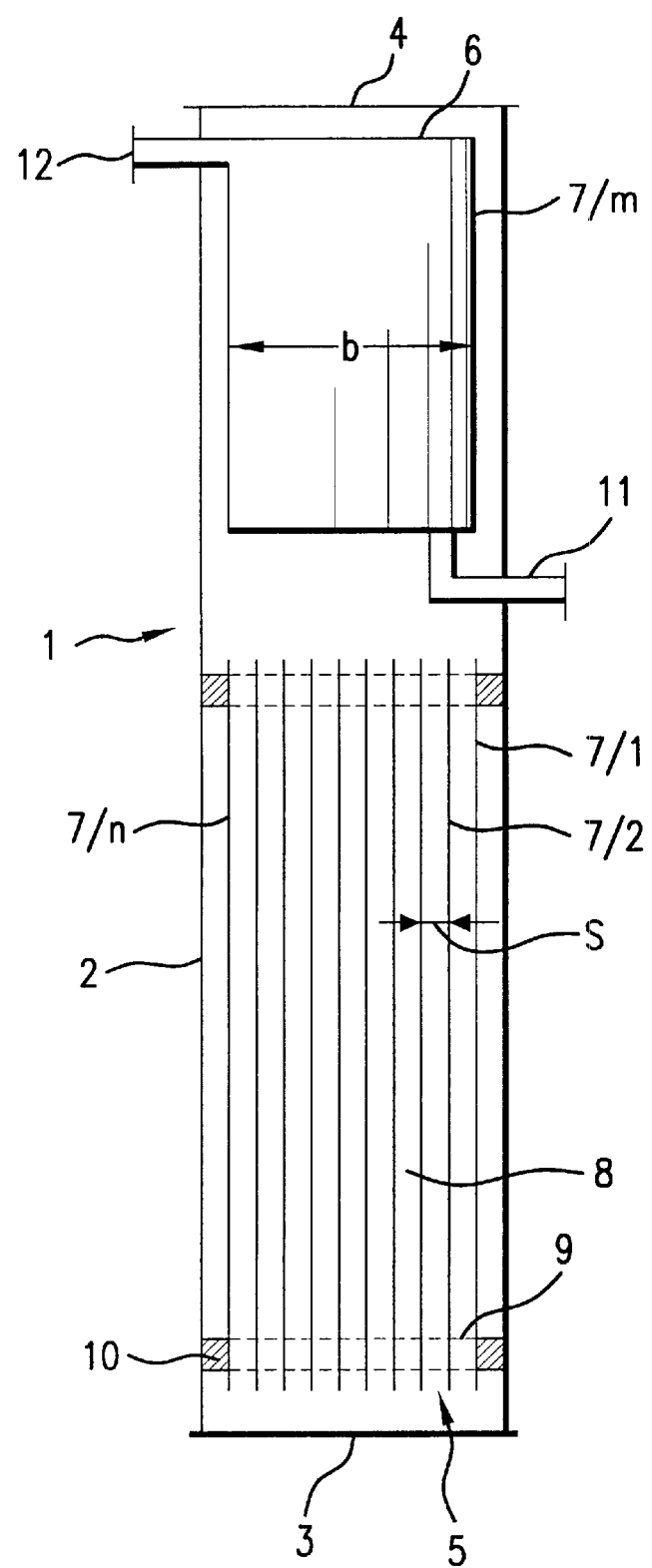
FIG. 1 shows a longitudinal section through a tubular continuous flow reactor with two plate stacks rotated by 90° to one another, one stack consisting of simple plates and the other of heat exchanger plates.

The construction is elucidated with reference to the preferred continuous flow reactor of FIG. 1. The tubular continuous flow reactor 1 comprises a reactor wall 2, an inlet 3 and outlet 4 and two plate stacks 5 and 6 arranged in the reactor tube. Each stack has several (n) plates 7/1 to 7/n arranged in parallel, which are aligned in the longitudinal direction to the pipe and thus form n+1 slit-shaped reaction chambers 8 which are open in the direction of flow. In the reactor of FIG. 1 the plate stack 5 is rotated by 90° with respect to the plate stack 6. The slit width corresponds to the plate spacing s—marked in the figure between plates 7/1 and 7/2. The plates are connected to one another by means of distance sleeves 9 and are fixed in the tube by means of anchors 10. The slit-shaped reactor chambers 8 have a width b, which is indicated in the plate stack 6 on the plate 7/m located in the middle of the tube by the plate width b. A feature which is essential for the invention, both of tubular reactors and of reactors with a different cross section, is that the ratio of the width b to the slit width s is, on average, greater than 3, preferably greater than 5 and particularly preferably greater than 10. The ratio b/s is usefully in the range of 5 to 100, especially in the range of 10 to 50, and the slit width in the range of 5 to 100 mm, especially in the range of 5 to 50 mm, particularly preferably 10 to 50 mm.

The plates can be open towards the reactor wall—as can be seen in the plate stack 5 in FIG. 2—or closed. In the case of an open construction—as can clearly be seen in FIG. 2—it is possible to design a plate stack with a more uniform plate width, and thus chamber width, which corresponds to a particularly simple design. In so far as the plates reach to the reactor wall, the plates necessarily have different widths in the case of a tubular reactor with a round cross section, so that in this case the ratio b/s denotes that of the average plate width per slit width.

In the reactor of FIG. 1 the plate stack 5 is made up of simple baffle plates, while the plate stack 6 on the other hand is made up of heat exchanger plates, to and from which a heating or cooling medium is fed through the connection pieces 11 and 12. To increase the turbulence, the plates can also be profiled. A reactor can have one or more plate stacks of the same or different designs.

Figure 2A:
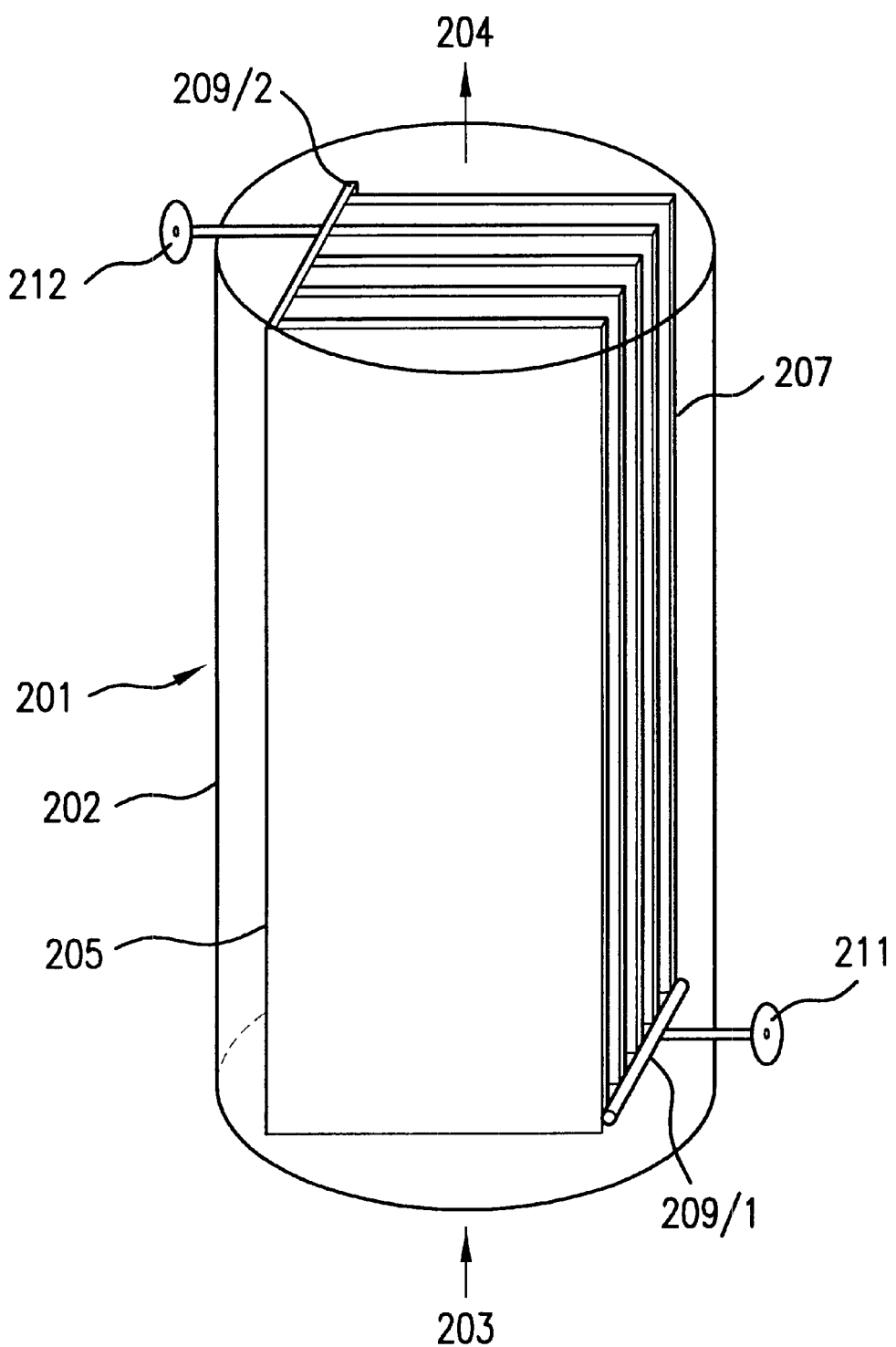
FIG. 2a shows a perspective view of a tubular continuous flow reactor with a stack of heat exchanger plates.
Figure 2B:
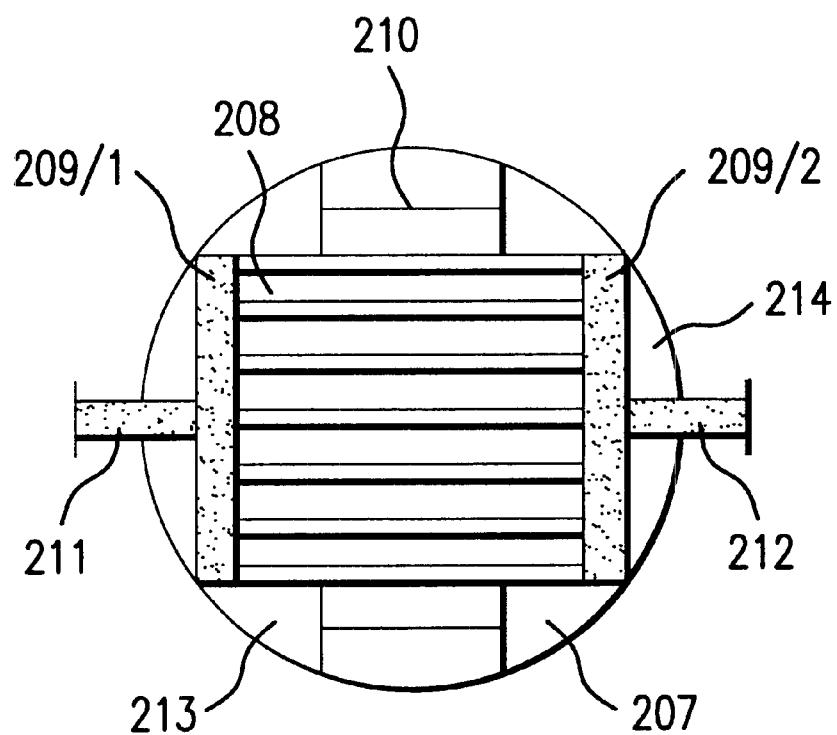

FIG. 2a shows a perspective, and partly open, view of a tubular reactor 201 with a stack 205 of several heat exchanger plates 207 of constant width arranged in parallel in the tube 202. The heating or cooling medium is fed to and from the plates through the connection pieces 211 and 212. The parallel arrangement of the plates is guaranteed here by means of the connecting studs or plates 209/1 and 209/2 which simultaneously act as distance sleeves and serve to distribute the heating/cooling medium to the individual plates. In FIG. 2b, a cross section of the reactor 201 shown in FIG. 2a is represented with an internal stack 205 of a heat exchanger, the references corresponding to those in FIG. 2a. In FIG. 2b, plate fixings (=anchors) 210 are additionally illustrated. The reaction medium, i.e. the gas-liquid mixture, flows through the reaction chambers 208 formed between the plates and through the tube segments 213 formed below and above the stack, and optionally also through the tube segments 214 formed to the left and right of the stack.

Figure 3:
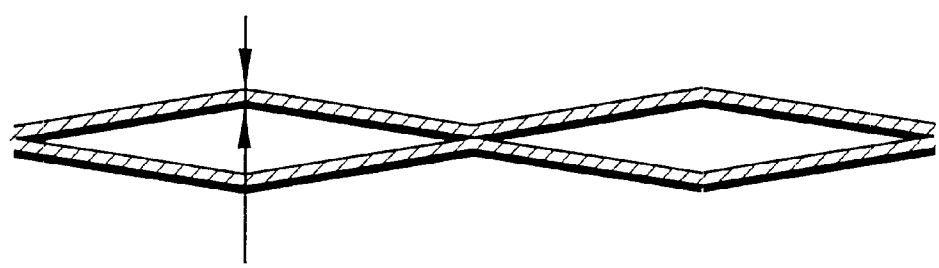
FIG. 3 shows a cross section through a profile heat exchanger plate.

It is possible both with simple baffle plates (according to stack 5 in FIG. 1) and with heat exchanger plates (according to stack 6 of FIG. 1 and FIGS. 2a and 2b) to give the plates a profiled shape in order to favour the formation of microturbulence. A profiled plate of this type is represented in cross section in FIG. 3, which is a welded heat exchanger plate with the channels for the heating/cooling medium.

Although tubular reactors are particularly preferred for the purposes of the invention, it is also possible to design block-shaped reactors with one or more plate stacks arranged therein with the feature b/s according to the invention. Block-shaped reactors of this type are useful if the plates consist of welded heat exchanger plates.

Figure 4:
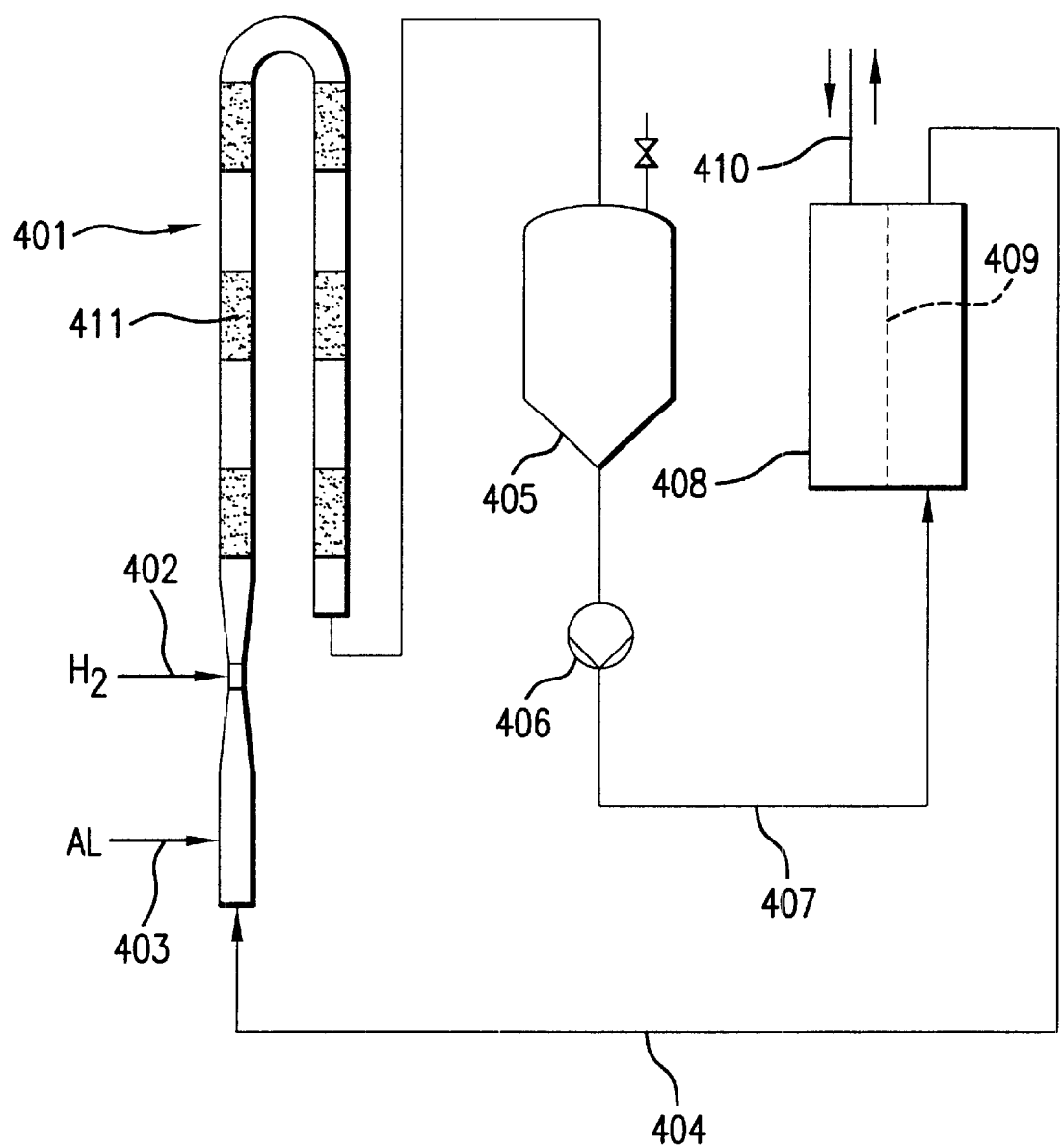
FIG. 4 shows a process diagram for carrying out the process according to the invention using the example of a hydrogenation in the presence of a suspension catalyst.

A process diagram for carrying out gas-liquid reactions in a reactor according to the invention is shown in FIG. 4, which illustrates hydrogenation of a working solution (AL) in the presence of a suspension catalyst. The process diagram shown can be applied to any gas-liquid reactions, for example to hydrogenations using a gas that contains hydrogen and a hydrogenation catalyst suspended in the liquid medium and oxidation reactions by means of a gas that contains oxygen.

One example of an application relates to a process for the production of hydrogen peroxide by the anthraquinone process. In a first step, an anthraquinone reaction support dissolved in a working solution is catalytically hydrogenated with hydrogen, in a subsequent step, the hydrogenated reaction support is oxidised with an $O_2$-containing gas and finally, hydrogen peroxide that has formed is extracted with water. In the process, the hydrogenation step is carried out in the presence of a suspension catalyst using a reactor according to the invention and/or the oxidation step is carried out using a reactor according to the invention. In the hydrogenation step of this process, the reaction support to be hydrogenated—usually a 2-alkyl anthraquinone or mixture of 2-alkyl anthraquinones and 2-alkyl tetrahydroanthraquinones-, dissolved in an organic solvent or mixture of solvents, is converted at least partly to the hydroquinone form in the presence of a suspension catalyst, usually palladium black. This hydrogenation step according to the invention can be performed using reaction supports, solvents and mixtures and suspension catalysts known in the prior art—reference is made in connection with this to the Ullmann citation mentioned above, vol. A13, 447–457 (1989).

The equipment according to FIG. 4 comprises two tubular continuous flow reactors 401 connected in series, designed according to the invention. Individual plate stacks 411, which are rotated with respect to one another, are indicated by the alternate grey and white segments. Hydrogen is introduced via a line 402 into the circulation line 404, which contains the reaction components in liquid, suspended or dissolved form and the suspension catalyst. The working solution AL containing a component to be hydrogenated is introduced via line 403 into the circulation line 404. The gas-liquid reaction mixture flows through the reactors 401, wherein the hydrogen is usefully completely converted. The liquid medium leaving the second reactor passes into the intermediate vessel 405 and from there is passed to a filter 408 via line 407 by means of a pump 406. In the filter 408, which contains different filter elements 409, for example filter candles, or can be in the form of a cross-flow filter, a partial stream 410 is freed of suspended catalyst by means of the filter elements. The partial stream 410 (=filtrate), a small part of which is also used for back-flushing the filter if necessary (this is indicated by the double arrow of different lengths), is fed into the subsequent or work-up steps. The part of the reacted reaction mixture flowing past the filter which contains the suspended catalyst is fed into the hydrogenation step via line 404. The quantity of liquid medium equivalent to the filtrate that has been drawn off is fed via line 403 to the line 404 before hydrogen is introduced.

As can be seen from Example B according to the invention and comparative example VB, the process according to the invention leads to a large increase in the space-time yield. Not only can the space-time yield be considerably increased by the surprisingly high efficiency of the reactor according to the invention, but at the same time the amount of apparatus needed and the energy requirements are reduced. Whereas, in the known process (according to U.S. Pat. No. 4,428,923), many reaction tubes arranged in a meandering shape were needed, the number of tubes could be reduced to less than a third, while maintaining the plant output, if these pipes were equipped with plate stacks according to the invention. Another advantage lies in the fact that the high circulation rate necessary up to now and the pump performance required for it become unnecessary. Whereas, up to now, only a partial stream was fed to the filter, while the main stream was fed back into the hydrogenation step, the hydrogenated working solution can now be freed of the suspension catalyst in the main stream. Another advantage is that the reduction in the number of reaction tubes is accompanied by a correspondingly large reduction in the total volume of working solution and suspension catalyst. The reduced number of reaction tubes further leads to lower plant costs owing to a smaller quantity of structural steel. Since only that quantity of the hydrogenated working solution which is not drawn off as filtrate is circulated, and in addition the pressure drop to produce the microturbulence in the plant is smaller than in the known process, the circulating pumps can be given smaller dimensions and thus also energy is expended.

The combination of a plate stack of simple plates represented in FIG. 2—if necessary the plates can also be profiled—and a stack of heat exchanger plates is given dimensions as proved necessary from the thermal balance of the reaction in question.

The unexpected and significant advantages of the reactor according to the invention are elucidated by the following example and comparative example.

EXAMPLE (B) AND COMPARATIVE EXAMPLE (VB)

In a device according to FIG. 4, but with three continuous flow reactors 401 according to the invention (=1½ loops), the hydrogenation step of the anthraquinone process for the production of hydrogen peroxide was carried out (B). Each of the three tubes contained a stack of simple plates and a stack of heat exchanger plates according to FIG. 1; the slit spacing was 25 mm, the width of the chambers an average of 350 mm.

For comparison purposes (VB) the process was carried out in a device according to FIG. 1 of U.S. Pat. No. 4,428,923, the reactor comprising 13 tubes (=6½ loops) and the circulating line 4a shown in FIG. 1 of the U.S. patent being in operation. The length of the tubes and the tube diameter were the same in the comparative example and the example according to the invention.

The working solution in B and VB was identical. It contained a mixture of 2-ethyl- and 2-amylanthraquinone and the tetrahydroanthraquinones thereof in a solvent mixture of a mixture of alkyl aromatics (Shellsol®) and trioctyl phosphate as the reaction support. The total quinones content was 175 g/l. The working solution contained palladium black as suspended catalyst in a quantity of approximately 1 g Pd/l working solution. At a temperature of 60° C., $H_2$ was introduced and the reaction support was hydrogenated.

In the example according to the invention and in the comparative example, the same quantity of working solution was discharged via the filter (408 in FIG. 4 of this application and 6 in FIG. 1 of the U.S. patent) and fed into the oxidation step, containing a specific proportion of hydroquinone in order to produce approx. 11 to 13 g $H_2O_2$/l working solution over the subsequent process steps.

As a result of the plate pack according to the invention in the reactor tubes, not only could the number of reactor tubes be reduced from 13 to 3, maintaining the plant output, but the volume of working solution contained in the reaction tubes, including the precious metal catalyst, could be reduced to less than a quarter of the quantity required in the comparative example. At the same time, the pressure drop in the plant, and thus the expenditure of energy, was reduced. It was also noted that the third tube in the example according to the invention was superfluous, since the reaction of the reaction support with the hydrogen was already complete in the second tube. As shown by the comparison, the space-time yield of the hydrogenation step (=kg $H_2O_2$ equivalent per $m^3$ reactor volume per hour) is considerably increased.

Documents and patents cited herein are hereby incorporated by reference.

What is claimed is:

1. A process for carrying out gas-liquid reactions, wherein a liquid phase, which is a reaction component or contains a reaction component in dissolved, emulsified or suspended form, and a gas phase containing a gas to be reacted, are passed in co-current, in the presence or absence of a catalyst, through a continuous flow reactor having at least three slit-shaped reaction chambers, arranged parallel to one another and designed for the same direction of flow, the ratio of plate width b to slit width s of which is, on average, greater than 3, wherein a continuous flow reactor is used, the reactor chambers of which have a slit width s in the range of 5 to 100 mm.

2. The process according to claim 1, wherein a tubular reactor is used, the chambers of which are formed by a plate stack arranged in a tube with a plate spacing s (=slit width) in the range of 5 to 50 mm and the ratio b/s of which is, on average, in the range of 5 to 100, wherein the chambers can be open or closed towards the wall of the reactor, but are open in the direction of flow.

3. The process according to claim 1, wherein a reactor is used in which at least some of the walls located between the reaction chambers are in the form of heat exchanger plates through which a heat exchanger medium flows, and the temperature in the reaction chambers is controlled by means of said medium.

4. The process according to claim 2, wherein a reactor is used in which at least some of the walls located between the reaction chambers are in the form of heat exchanger plates through which a heat exchanger medium flows, and the temperature in the reaction chambers is controlled by means of said medium.

5. The process according to claim 2, wherein a reactor is used which has at least one plate stack of simple plates forming chambers which are parallel in the direction of flow and at least one plate stack of heat exchanger plates forming chambers which are parallel in the direction of flow, and the temperature is controlled by means of a medium flowing through the heat exchanger plates.

6. The process according to claim 3, wherein a reactor is used which has at least one plate stack of simple plates forming chambers which are parallel in the direction of flow and at least one plate stack of heat exchanger plates forming chambers which are parallel in the direction of flow, and the temperature is controlled by means of a medium flowing through the heat exchanger plates.

7. The process according to claim 1, wherein a reactor is used, the chambers of which have a slit width s in the range of 10 to 50 mm and on average a ratio b/s in the range of 10 to 50.

8. The process according to claim 6, wherein a reactor is used, the chambers of which have a slit width s in the range of 10 to 50 mm and on average a ratio b/s in the range of 10 to 50.

9. The process according to claim 1, wherein the liquid phase contains a dissolved reaction component and a suspension catalyst.

10. The process according to claim 6, wherein the liquid phase contains a dissolved reaction component and a suspension catalyst.

11. The process according to claim 7, wherein the liquid phase contains a dissolved reaction component and a suspension catalyst.

12. The process according to claim 1, wherein the gas-liquid reaction is a catalytic hydrogenation using a hydrogen-containing gas or an oxidation using an oxygen-containing gas.

13. The process according to claim 9, wherein the gas-liquid reaction is a catalytic hydrogenation using a hydrogen-containing gas or an oxidation using an oxygen-containing gas.

14. The process according to claim 12, wherein the liquid phase is a working solution containing dissolved anthraquinone reaction supports for the production of hydrogen peroxide by the anthraquinone process, which contains a suspension hydrogenation catalyst, and the gas phase is a hydrogen-containing gas.

15. The process according to claim 13, wherein the liquid phase is a working solution containing dissolved anthraquinone reaction supports for the production of hydrogen peroxide by the anthaquinone process, which contains a suspension hydrogenation catalyst, and the gas phase is a hydrogen-containing gas.

16. A process according to claim 1, wherein the gas-liquid reaction is carried out in a tubular continuous flow reactor.

* * * * *